United States Patent [19]
Brown

[11] 3,750,250
[45] Aug. 7, 1973

[54] PRINTER'S ROLLER AND METHOD OF MAKING SAME

[75] Inventor: James K. Brown, Arlington Hgts., Ill.

[73] Assignee: Samuel Bingham Company, Franklin Park, Ill.

[22] Filed: Aug. 31, 1972

[21] Appl. No.: 285,227

[52] U.S. Cl. ............................ 29/148.4 D, 29/129
[51] Int. Cl. ...................... B23p 11/00, B21h 1/14
[58] Field of Search ................ 29/148.4 D, 129, 29/148.4 R; 156/154

[56] References Cited
UNITED STATES PATENTS
3,184,355  5/1965  Brown............................ 29/129 X
3,187,409  6/1965  Glass............................ 29/148.4 D Primary Examiner—Thomas H. Eager
Attorney—James A. Davis, Lawrence W. Brugman et al.

[57] ABSTRACT

Lightweight printer's roller having sleeve of either rubber extruded onto long aluminium tube or elastomer, such as urethane, cast onto tube, cut to desired length, broached at ends to form keyways for receiving keys on journals injection molded of suitable plastic, with journals secured in tube by press fit or with adhesive, and thereafter trued, and outer surface of roller finished by grinding and end trimming.

10 Claims, 3 Drawing Figures

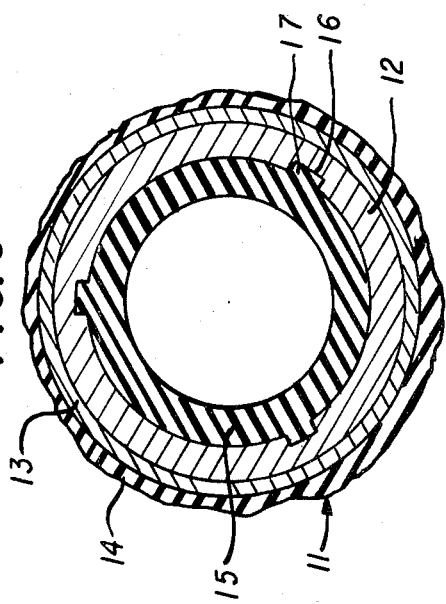
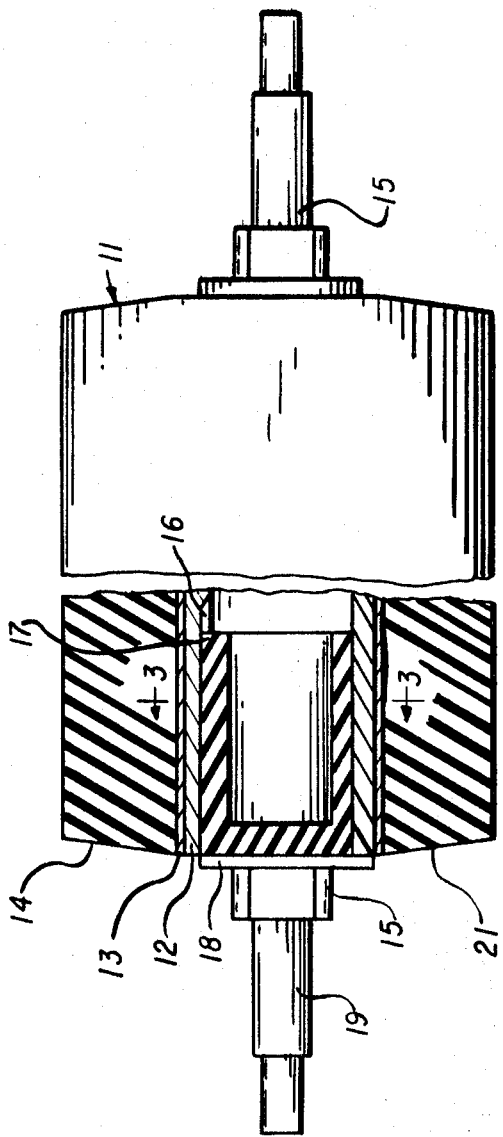
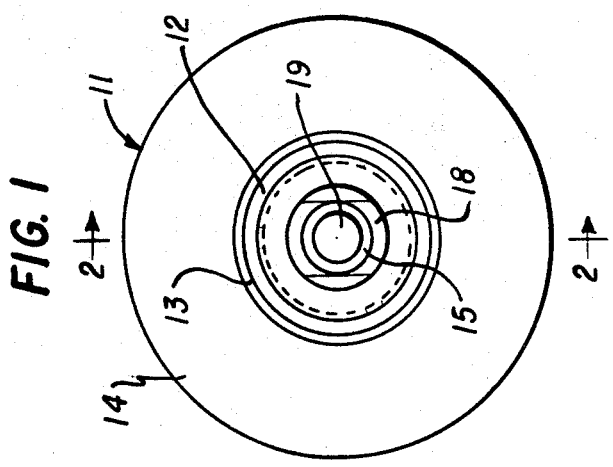

PRINTER'S ROLLER AND METHOD OF MAKING SAME

BACKGROUND OF THE INVENTION

1. Field of the Invention

This invention relates generally to printer's rollers, and more particularly to relatively small rollers, as those for use in offset printing.

2. Description of the Prior Art

It has been customary to use relatively heavy metal cores for such printer's rollers which makes them expensive to manufacture and to refinish when worn. The cost of shipping worn rollers from their point of use back to the manufacturer for recovering has been taken care of, as disclosed in U. S. letters Pat. No. 3,184,355, by providing a preformed outer covering for the metal core comprising a tubular sleeve of extruded rubber vulcanized to a liner of stretched knitted cotton fabric, which is adhered to the core and may be replaced at the point of use, when worn, by a similar covering after the worn one is cut away from the core.

SUMMARY OF THE INVENTION

The object of this invention is to eliminate the relatively heavy metal cores of such printer's rollers and thereby reduce the cost thereof to the point that it is feasible to discard the entire roller when the covering becomes worn. This is accomplished by providing a lightweight printer's roller by starting with a long and relatively thin metal tube, preferably of aluminum and coated with a suitable adhesive; securing an outer sleeve thereon, as by extruding rubber onto the tube and curing and bonding the same thereto by vulcanizing, or casting onto the tube an elastomer, such as urethane; cutting off a portion of the covered tube of desired length; securing journals, which preferably are injection molded of a suitable plastic, in the ends of the tube, as by broaching keyways in the tube ends to receive keys formed on the journals, and press fitting the journals or using a suitable adhesive; and truing the extending portions of the journals and finishing the outer surface of the roller by grinding and end trimming, as in a lathe. Such novel structure and method of making lightweight printer's rollers has the additional advantage of reducing the number of different diameters of the long covered tubes required to only three or four to enable the manufacturer to provide such rollers in any of the standard sizes.

IN THE DRAWINGS

FIG. 1 is an end elevational view of a printer's roller embodying the features of this invention;

FIG. 2 is a longitudinal elevation with the left portion thereof shown in longitudinal vertical section taken substantially on the line 2—2 of FIG. 1; and FIG. 3 is a detail vertical section taken substantially on the line 3—3 of FIG. 2 on an enlarged scale.

DESCRIPTION OF THE PREFERRED EMBODIMENT

Referring more particularly to the drawings, reference numeral 11 indicates in general a lightweight printer's roller embodying the features of this invention, which comprises a central member made from a long and relatively thin metal tube 12, preferably of aluminum. In the manufacture of this roller, tube 12 is of a length comprising a multiple of the maximum length in the direction of its longitudinal axis of the roller, for reasons which will be more readily apparent hereinafter. The outer surface of the tube 12 is covered with a suitable adhesive 13 (FIGS. 2 and 3). An outer elastomer sleeve 14 is adhered to the tube 12 to provide the desired roller covering. This sleeve 14 preferably is of rubber extruded onto the tube and thereafter cured and bonded to the tube in a vulcanizer in a manner well understood in the art. If desired, however, the sleeve 14 may be made of urethane cast onto the tube while the latter is mounted in a suitable mold.

In any event, after the covered tube 12–14 is completed, it may be stored until specific orders are received by the manufacturer for rollers of that diameter in any requested length. To complete the roller 11, an end portion of the desired length is cut off of the covered tube 12–14 and plastic journals 15 are mounted in the ends thereof. To this end, the tube 12 may be interiorly finished to accurately receive the journals 15 which may be adhesively secured thereto. Preferably, however, the interior finishing of the covered tube 12–14 comprises broaching of keyway means 16 (FIG. 3) in the inner surfaces of the outer end portions of the tube 12 for receiving axially extending key means 17 formed on the inner portions of the outer surfaces of the journals 15. It is preferred that the journals 15 be injection molded, which method lends itself to such formation of the key means 17 integrally therewith. And with broaching of the tube 12 to form the keyway means 16, this will result in very accurate dimensioning of these parts to facilitate press fitting of the journals 15 into the covered tube 12–14. In order to insure proper longitudinal positioning of each journal 15, it is provided with a peripheral flange 18 intermediate its ends (FIG. 2) for inward movement-limiting abutment against the associated outer end of the tube 12 as the journal is being inserted therein.

Thereafter, truing and finish tooling, if necessary, of the outwardly extending portions 19 of the journals 15 may be accomplished in a lathe or other suitable device, and finishing of the outer surfaces of the roller is accomplished by grinding the peripheral surface of the sleeve 14, also in a lathe, or the like, and trimming the ends thereof as indicated at 21 in FIG. 2.

As previously noted, the covered tube 12-14 is made in a length which is a multiple of the maximum standard length of printer's rollers for offset printing and the like. Since such standard rollers are employed in only three or four different diameters, it therefore will be necessary to make such covered tubes 12–14 only in those three or four different diameters. This will enable the manufacturer to store a plurality of those relatively few differently sized tubes and proceed with the completion of any rollers ordered by cutting from such tubes of the ordered diameter the necessary number of pieces of the ordered length. This greatly facilitates and renders much less expensive the manufacturing of the instant printer's rollers. In fact, the cost of production is thereby reduced to the point that it is feasible to discard an entire roller when the cover becomes worn. Thus, not only is the original shipping cost of such end products reduced because of the substitution of the lightweight tube 12 and journals 15 for the customary heavy metal core, but further costs of shipping for repair purposes and stripping and replacement of worn sleeves 14 are completely eliminated.

It is thought that the invention and many of its attendant advantages will be understood from the foregoing description, and it will be apparent that various changes may be made in the form, construction and arrangement of the parts and in the method steps embodied without departing from the spirit and scope of the invention or sacrificing all of its material advantages, the form hereinbefore described being merely a preferred embodiment thereof.

I claim:

1. A printer's roller, comprising a relatively thin metal tube, an outer elastomer sleeve surrounding and secured to said tube, and plastic journals extending into the ends of said tube and secured thereto.

2. A printer's roller according to claim 1, wherein said journals have axially extending key means formed on the inner portions of their outer surfaces, and said tube is provided with interior keyway means receiving said key means.

3. A printer's roller according to claim 1, wherein said tube is aluminum.

4. A printer's roller according to claim 1, wherein the outer surface of said tube is coated with a suitable adhesive and said sleeve is rubber extruded onto said tube and cured and bonded thereto by vulcanizing.

5. A printer's roller according to claim 1, wherein said sleeve is of urethane cast onto said tube.

6. A printer's roller according to claim 1, wherein said journals are injection molded and press fitted into said tube.

7. The method of making a printer's roller, comprising adhering and outer elastomer sleeve to a long and relatively thin metal tube, cutting a desired length off of said tube so covered, mounting plastic journals in the ends of said covered tube, truing the extending portions of said journals and finishing the resulting roller by grinding the outer surface of said sleeve.

8. The method of making a printer's roller according to claim 7, including first coating the exterior of said tube with a suitable adhesive, and wherein said sleeve is of rubber and said adhering thereof to said tube comprises extruding the rubber onto said tube and curing and bonding the same thereto by vulcanizing.

9. The method of making a printer's roller according to claim 7, wherein said mounting of said journals comprises interiorly finishing the ends of said covered tube to receive the inner ends of said journals.

10. The method of making a printer's roller according to claim 9, wherein the inner ends of said journals include axially extending key means on their outer surfaces, and said interior finishing of said covered tube comprises broaching of keyway means for receiving said key means.

* * * * *